United States Patent Office 2,870,227
Patented Jan. 20, 1959

2,870,227

NOVEL DITOLYL ALKANES AND PROCESS FOR PREPARING THE SAME

John C. Petropoulos, Norwalk, Conn., assignor to American Cyanamid Company, New York, N. Y., a corporation of Maine No Drawing. Application November 21, 1956
Serial No. 623,557

6 Claims. (Cl. 260—668)

This invention relates to a novel class of ditolyl alkanes and to the process of preparing the same. Still further, this invention relates to a novel class of ditolyl alkanes in which the tolyl groups are joined together through a common, non-terminal carbon atom and to the process of preparing the same. More particularly, this invention relates to a process for preparing a class of compounds having the general formula:

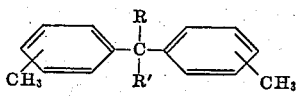

wherein R is an alkyl group having from 1 to 4 carbon atoms and R' is an alkyl group having from 2 to 4 carbon atoms and to the products thus produced.

One of the objects of the present invention is to produce a novel class of ditolyl alkanes. A further object of the present invention is to produce a novel class of ditolyl alkanes which will have utility in a plurality of applications, particularly, for use in an oxidizing reaction whereby novel dicarboxylic acids are produced. These and other objects of the present invention will be discussed in greater detail hereinbelow.

This application is a continuation-in-part of my earlier application having the Serial No. 523,355, filed July 20, 1955, now U. S. Patent No. 2,848,486, entitled "Novel Products and Process for Preparing the Same." In my earlier application, I have disclosed and claimed methods for preparing certain alkylidene dibenzoic acids and their use in the manufacture of alkyd resins.

The novel hydrocarbons of the present invention may be used to produce, when oxidized, some of the class of the dicarboxylic acids disclosed and claimed in my application referred to hereinabove. The ditolyl alkanes of the present invention may be described as compounds in which the tolyl groups are joined together through a common, non-terminal carbon atom. The ditolyl alkanes in which the tolyl groups are joined together through a terminal carbon atom of the alkane are not readily oxidizable to the corresponding dicarboxylic acid and, in fact, there is often cleavage between the two tolyl groups in which oxidation takes place on the alkane group joining the tolyl groups rather than on the methyl groups on the aryl nuclei. Even though such a ditolyl alkane were to be oxidized successfully to the corresponding dicarboxylic acid, the alkyd resin produced therefrom would show a lack of heat stability, light stability, lack of good color, color stability, gloss and strength. Still further, such an alkyd resin would not be stable to mild oxidizing conditions such as air at elevated temperatures in the presence of metallic salt driers. The exact opposite is true of alkyd resins prepared from dicarboxylic acids resulting from the oxidation of the ditolyl alkanes of the present invention.

The ditolyl alkanes of the present invention may be prepared by reacting a compound having the general formula:

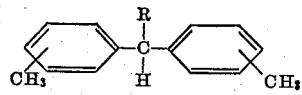

wherein R is an alkyl group having from 1 to 4 carbon atoms with a monoolefin having from 2 to 4 carbon atoms. Illustrative of these monoolefins are such materials as ethylene, propylene and butylene, either α, β, or isobutylene.

In the practice of the process of the present invention, it is desired to maintain, in the sphere of reaction, a temperature of between about 100° C. and 200° C. and preferably 130° C. to 160° C.

Inasmuch as difficulties are sometimes experienced if the present process is carried out at atmospheric pressure, it is far more desirable to carry out the alkylation reaction at a pressure between about 50 p. s. i. and 1000 p. s. i. and preferably between about 300 p. s. i. and 800 p. s. i.

In alkylating the 1,1-ditolyl alkanes in the present invention, it is desirable to make use of a free alkali metal such as sodium, potassium, lithium, rubidium and cesium. Sodium is actually preferred. It is frequently desirable to make use of a promoter in minor amounts which promoter cooperates with the free alkali metal to accelerate the process and to increase the yield which promoter is in the nature of an organic compound such as a hydrocarbon halide. The hydrocarbon nucleus may be alkyl, alkenyl, cycloalkyl, aralkyl, aryl and alkaryl. The halogen atom may be either chlorine, bromine, iodine or fluorine. Chlorine and bromine are actually preferred. Other promoters may be used such as alcohols, acids, ethers, nitrates, and cyano derivatives. Still further, one may use as a promoter a polycyclic hydrocarbon which is capable of reacting with a portion of said free alkali metal to form a metalized polycyclic hydrocarbon. Illustrative of the hydrocarbon halides which may be used in the practice of the process of the present invention are ethyl chloride, ethyl bromide, n-propyl chloride, isopropyl chloride, n-butyl chloride, isobutyl chloride, secondary butyl chloride, tertiary butyl chloride, allyl chloride, benzoyl chloride, tolyl chloride, tolyl bromide, cyclohexyl fluoride, 1,1-dichloro-3,3-dimethyl butane and the like.

Among the alcohols which may be used in combination with the alkali metal promoters for the alkylation reation are ethanol, isobutanol, isoamyl alcohol and the like. One can additionally use carboxylic acids, particularly, aromatic monocarboxylic acids such as benzoic acid, o-toluic acid and the like. Nitrobenzene and other nitroalcoholic hydrocarbons and nitroalkanes may also be used with alkali metals to form effective catalysts for the process. The cyano compounds include $C_6H_5CN$. In general, an excess of the alkali metal is employed relatively to the promoter which is also present in the catalyst mixture. Among the polycyclic hydrocarbons which are capable of reacting with a portion of said free alkali metal to form a metalized polycyclic hydrocarbon and used as a promoter of the alkylation reaction are anthracene, dihydro-anthracene, fluorene, phenanthrene, tetralin, diphenylmethane, o-diphenyl benzene and the like.

The amount of free alkali metal catalyst used in the process is dependent upon the particular alkali metal selected and the reactivity of the ditolyl alkane undergoing side chain alkylation and upon the nature of the olefin used as the side chain alkylating agent. It has been found that large amounts of free alkali metal are desirable, particularly, when the reaction is carried out under conditions which do not assure thorough mixing. It is preferred to use more than about 2% by weight of free alkali metal based on the ditolyl alkane reactant. The amount of promoter necessary depends on the mole ratio of free alkali metal to promoter. This mole ratio should be at least 2:1 up to about 10:1 free alkali metal to promoter, respectively. Whenever desirable, even larger amounts can be used.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

Into an autoclave there is introduced 105 parts of 1,1-di(p-tolyl)ethane, 5 parts of sodium and 1.5 parts of o-toluic acid. The system is purged with nitrogen gas and then sealed. The autoclave is then heated to about 170° C. and the pressure is released. There is then charged 11.8 parts of ethylene to 900 p. s. i. and the system is closed. The temperature is then maintained at 170° C. with intermittent addition of ethylene until no further pressure drop is experienced. This requires about 6 hours. The autoclave is then cooled and the reaction products are filtered and washed with hexane. The filtrates are combined, washed and distilled. The product produced is 2,2-di(p-tolyl)butane having a boiling point of 196° C. at 20 millimeters of pressure.

Example 2

The preceding example is repeated in all essential details except that in the place of 1,1-di(p-tolyl)ethane, there is substituted an equivalent amount of 1,1-di(p-tolyl)propane and in the place of the o-toluic acid, there is substituted an equivalent amount of o-chlorotoluene. The resultant product is a viscous liquid having a boiling point of 213–220° C. at 15 mm. of mercury. The product is 3,3-di(pi-tolyl)pentane.

Among the ditolyl alkanes which may be prepared by a comparable process and which are representative of the ditolyl alkanes of the present invention are 2,2-di(p-tolyl)butane; 2,2-di(o-tolyl)butane; 2,2-di-(m-tolyl)butane; 2,2-di(p-tolyl)pentane; 2,2-di(o-tolyl)pentane, 2,2-di(m-tolyl)pentane; 3,3 - di(p-tolyl)pentane; 3,3 - di(o-tolyl)pentane; 3,3-di(m-tolyl)pentane; 2,2-di(p-tolyl)hexane; 3,3-di(o-tolyl)hexane; 3,3-di(p-tolyl)heptane; 3,3-di(o-tolyl)heptane; 4,4-di(p-tolyl)heptane; 4,4-di(p-tolyl)octane; 5,5-di(p-tolyl)nonane; 5,5-di(o-tolyl)nonane; 5,5-di(m-tolyl)nonane, and the like.

The ditolyl alkanes of the present invention will have utility in fields other than intermediates for the preparation of dibenzoic acids such as in the field of heat transfer media for which the present hydrocarbon materials are particularly suited in view of the wide liquid range which they cover. Additionally, these ditolyl alkanes will find utility as hydraulic fluids. Still further, these ditolyl alkanes may be used as plasticizers for thermoplastic resinous materials such as polystyrene and copolymers thereof.

I claim:

1. A process for the preparation of a hydrocarbon having the formula:

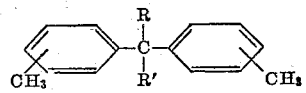

wherein R is an alkyl group having from 1 to 4 carbon atoms and R' is an alkyl group having from 2 to 4 carbon atoms comprising reacting a compound having the formula:

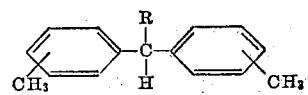

with a monolefin having two to four carbon atoms.

2. A process for preparing 2,2-di(p-tolyl)butane comprising reacting 1,1-di(p-tolyl)ethane with ethylene.

3. A process for preparing 3,3-di(p-tolyl)pentane comprising reacting 1,1-di(p-tolyl)propane with ethylene.

4. A compound having the general formula

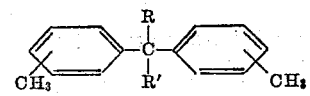

wherein R is an alkyl group having from 1 to 4 carbon atoms and R' is an alkyl group having from 2 to 4 carbon atoms.

5. 2,2-di(p-tolyl)butane.
6. 3,3-di(p-tolyl)pentane.

References Cited in the file of this patent

UNITED STATES PATENTS

| Number | Name | Date |
|---|---|---|
| 2,500,369 | McCoubrey et al. | Mar. 14, 1950 |
| 2,682,561 | Rogers et al. | June 29, 1954 |
| 2,688,044 | Pines et al. | Aug. 31, 1954 |
| 2,719,871 | Hiatt | Oct. 4, 1955 |
| 2,721,885 | Pines et al. | Oct. 25, 1955 |
| 2,769,850 | Closson et al. | Nov. 6, 1956 |

FOREIGN PATENTS

| Number | Country | Date |
|---|---|---|
| 446,450 | Great Britain | Apr. 30, 1936 |